United States Patent [19]

Sano et al.

[11] Patent Number: 4,781,562
[45] Date of Patent: Nov. 1, 1988

[54] HEAT DISPLACING TYPE DIES

[75] Inventors: Takayoshi Sano; Hidemi Wada; Satoru Nitta; Katsuhiko Iguchi; Kenji Nozawa; Hiroshi Serizawa, all of Numazu, Japan

[73] Assignee: Toshiba Kikai Kabushiki Kaisha, Tokyo, Japan

[21] Appl. No.: 83,812

[22] Filed: Aug. 11, 1987

[30] Foreign Application Priority Data

Aug. 12, 1986 [JP] Japan .................. 61-189378
Aug. 12, 1986 [JP] Japan .................. 61-123513

[51] Int. Cl.$^4$ ............... B29C 47/16; B29C 47/92
[52] U.S. Cl. .................... 425/141; 264/40.5; 264/176.1; 425/143; 425/466
[58] Field of Search ............ 425/133.5, 140, 141, 425/143, 144, 381, 466; 264/40.5, 176.1, 177.1

[56] References Cited

U.S. PATENT DOCUMENTS

| | | | |
|---|---|---|---|
| 3,341,388 | 9/1967 | Bunyea | 425/141 X |
| 3,920,365 | 11/1975 | Mules | 425/141 |
| 3,940,221 | 2/1976 | Nissel | 425/141 |
| 4,252,519 | 2/1981 | Farmer et al. | 425/141 X |
| 4,281,980 | 8/1981 | Hoagland et al. | 425/141 X |
| 4,454,084 | 6/1984 | Smith et al. | 425/141 X |
| 4,514,348 | 4/1985 | Iguchi et al. | 264/40.5 X |
| 4,669,965 | 6/1987 | Murakami | 425/133.5 |
| 4,704,083 | 11/1987 | Iguchi et al. | 425/466 |
| 4,726,752 | 2/1988 | Van Dun | 425/144 X |

Primary Examiner—Richard L. Chiesa
Attorney, Agent, or Firm—Cushman, Darby & Cushman

[57] ABSTRACT

In a heat displacing type die adapted to extrude a sheet of molten resin, a heat displacing unit provided with a heater is secured to an upper die block. A lip gap is defined between a flexible lid and a stationary lip respectively provided for the upper and lower die blocks. The lower end of a bolt extending through the heat displacing unit is normally in contact with or secured to the flexible lip while the upper end is secured to the upper portion of the heat displacing unit. In a modified embodiment the bolt is air cooled.

7 Claims, 3 Drawing Sheets

HEAT DISPLACING TYPE DIES

BACKGROUND OF THE INVENTION

This invention relates to a heat displacing type die for extruding a molten resin. Although not limited thereto, the invention is suitable for use as a heat displacing type T die in which a sheet or film of an extruded molten resin is spread transversely to increase its width.

A typical example of the T die is disclosed in U.S. Pat. No. 3,940,221. As shown in FIG. 3, in the T die disclosed therein comprises a lip gap 3 defined between a stationary lip 1 and a flexible or movable lip 2. The lip gap is adjusted by displacing the flexible lip 2 with a bolt 4. The bolt 4 extends through a metal heating block 5 made of steel to reach the flexible lip 2. A cartridge heater 6 is provided on the inner surface of the block 5 for heating the bolt 4 with a cooling passage 7 therebetween. Cooling air is blown into the passage 7 in a direction shown by an arrow. From the inner end of passage the air flows transversly. As a consequence, when the bolt 4 is heated by the cartridge heater 6, the bolt 4 elongates to narrow the lip gap 3 by pushing down the flexible lip 2. Conversely, as the bolt 4 cools, the lip gap 3 is widened. Where the width of the extruded resin sheet is large, a plurality of T dies are juxtaposed side by side.

The lip gap adjustment is possible even with the prior art heat displacing type die. However, since this prior art device is constructed to vary the lip gap by utilizing the thermal expansion and contraction of the bolt 4 so as to adjust the flow quantity of a molten resin, a substantially large temperature difference, 100° C. or more, would be created among a plurality of juxtaposed bolts. Such temperature difference has a more or less effect upon parts other than the bolts. Particularly, the temperature difference has an influence upon the viscosity of a molten resin extruded through the lip gap. For this reason, a heat insulating layer 8 is provided between the heating block 5 and the upper die block 2A formed with the flexible lip 2 for preventing heat transmission from the bolt 4 to the molten resin. However, perfect interruption of such heat transmission is actually impossible. Moreover there are other heat transmission paths, for example from the bolt 4 to the flexible lip 2. Thus it is impossible to prevent variations in the temperature and viscosity of the molten resin.

When the bolt is caused to expand by heat, although the lip gap is narrowed to decrease the flow quantity of the molten resin, the heat is transmitted through various heat transmitting routs to decrease the viscosity of the molten resin, thus increasing its flow quantity. Conversely when the bolt shrinks, the lip gap is increased to increase the flow quantity. On the other hand, the viscosity of the molten resin increases thus causing a decrease in the flow quantity. In this manner, the variation in the lip gap and the variation in the flow quantity caused by the viscosity variation contradict with each other. For example, even when the lip gap is decreased for the purpose of decreasing the flow quantity of the molten resin the resin viscosity tends to decrease thereby increasing the flow quantity thus failing to adjust the lip gap as desired. The same problem occurs when the lip gap is increased.

SUMMARY OF THE INVENTION

Accordingly, it is an object of this invention to provide an improved heat displacing type die wherein the effect of varying the flow quantity of a molten resin passing through a lip gap and the effect of the variation in the flow quantity caused by a variation in the viscosity assist each other, thereby forming resin sheets having a uniform thickness and smooth surface.

According to this invention there is provided a heat displacing type die adapted to extrude a sheet of a molten resin wherein a plurality of heat displacing units juxtaposed in the transverse direction of the sheet are heat controlled so as to transmit thermal expansion or contraction of the units to flexible lips defining lip gaps through bolt means thereby adjusting said lip gaps, characterized in that there are provided means for securing one end of each heat displacing unit to a die block, means for flexing each flexible lip in response to thermal expansion or contraction of each heat displacing unit and means for securely connecting one end of the bolt means to the other end of the heat displacing unit, whereby the lip gaps are widened or narrowed when the heat displacing units expand or contract.

According to a modified embodiment the bolt means is cooled by air.

DESCRIPTION OF THE PREFERRED EMBODIMENTS

Figure 1:
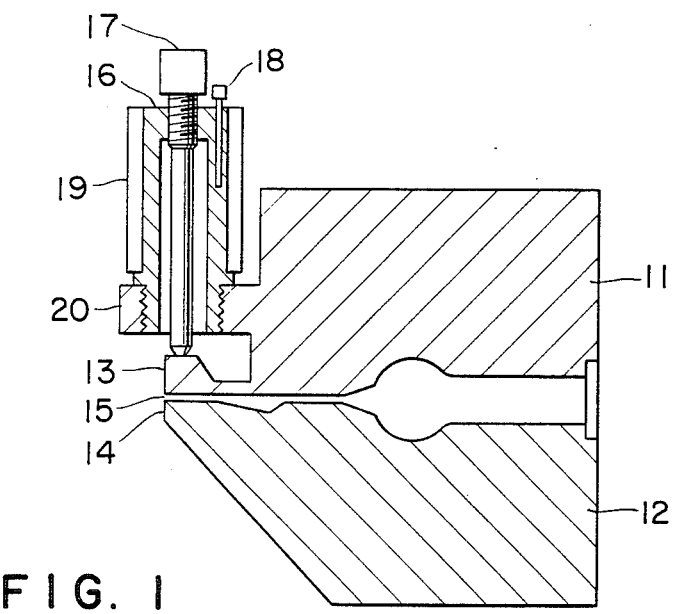
FIG. 1 is a longitudinal sectional view showing a heat displacing type die for extruding a molten resin embodying the invention.

A preferred embodiment of this invention will now be described with reference to FIG. 1. The die shown therein comprises an upper die block 11 and a lower die block 12 respectively provided with a flexible lip 13 and a stationary lip 14 at their outer ends, lips 13 and 14 defining a lip gap 15 for extruding a molten resin. One ends of a plurality of heat displacing units 16 which are juxtaposed in the transverse direction of the lip gap 15 are threaded into projections 20 projecting to the left from the upper die blocks 11 to lie above the flexible lips 13. Each heat displacing unit 16 is formed with a central perforation to receive a bolt 17. The upper end of each bolt 17 is threaded to the upper end of heat displacing unit 16 while the lower end engages with the upper surface of the flexible lip 13. A thermostat 18 is embedded in each heat displacing unit 16, and an electric heater 19 is provided to surround the heat displacing unit 16. The thermal expansion coefficients $\alpha 1$ and $\alpha 2$ of the unit 16 and bolt 17 are selected to satisfy a relation $\alpha 1 \geq \alpha 2$.

In operation, as the heat displacing unit 16 is heated by heater 19, bolt 17 is also heated. As the heat displacing uninit 16 is heated, its upper end extends upwardly. Where the thermal expansion coefficient of the heat displacing unit 16 is selected to be larger than that of the bolt 17, the thermal displacing unit 16 expands by an amount larger than that of the bolt 17. Since the upper end of the heat displacing unit 16 is threaded to the upper end of the bolt 17, the bolt 17 will be pulled upwardly tending to separate away from the flexible lip 13. As a consequence, the flexible lip 13 flexes upwardly. Even when the thermal expansion coefficients of the heat displacing unit 16 and bolt 17 are equal, since the unit 16 is located closer to the heater 19, the amount of expansion of the heat displacing unit 16 is larger than that of the bolt 17 so that the bolt 17 will be pulled upwardly. As a result, the lip gap 15 is widened to increase the flow quantity of the molten resin. At the same time the temperature of the flexible lip 13 increases due to the heat transmitted through bolt 17. This temperature rise decreases the viscosity of the molten resin thus increasing its flow quantity.

Upon deenergization of heater 19, the heat displacing unit 16 cools and shrinks. Where the thermal expansion coefficient of the heat displacing unit 16 is selected to be larger than that of bolt 17, the unit 16 shrinks by an amount larger than that of bolt 17 so that the flexible lip 13 is pressed downwardly by bolt 17, thereby flexing downwardly. Even when the thermal expansion coefficients of the heat displacing unit 16 and the bolt 17 are selected to be equal, since the temperature of the unit 16 decreases much more than that of bolt 17 because the unit 16 is located on the outside of bolt 17, the unit 16 shrinks grealy with the result that the flexible lip 13 is pressed downwardly by bolt 17. As above described, when the heat displacing unit 16 quantity of the molten resin. At the same time, also the molten resin cools and its viscosity increases thereby decreasing the flow quantity of the molten resin.

Figure 2:
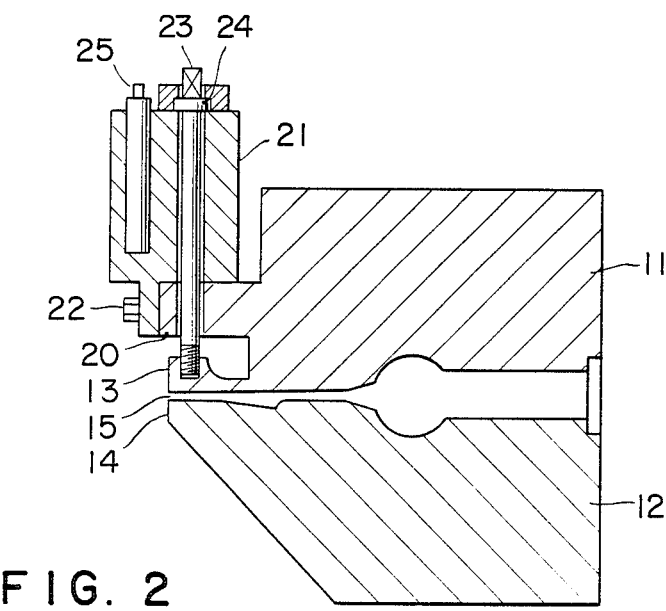
FIG. 2 is a longitudinal sectional view showing a modified embodiment of this invention.
Figure 3:
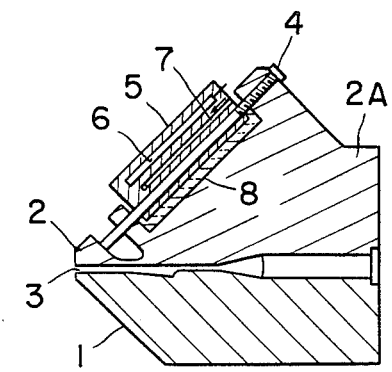
FIG. 3 is a longitudinal sectional view showing a prior art heat displacing type die.

FIG. 2 shows another embodiment of this invention. In this modification, the lower end of a heat displacing unit 21 is secured to the projection 20 of the upper die block 11 by means of a bolt 22. A bolt 23 extends through the heat displacing unit 21. The lower end of the bolt 23 is threaded into the flexible lip 13, while the upper end of bolt 23 is secured to the upper end of the heat displacing unit 21 through a flange 24 and screws, not shown. An electric heater 25 and a thermocouple, not shown, are embedded in the heat displacement unit 21. Reference numerals 11–15 represent the same parts as in FIG. 1. This modification operates in the same manner as in the first embodiment.

Figure 4:
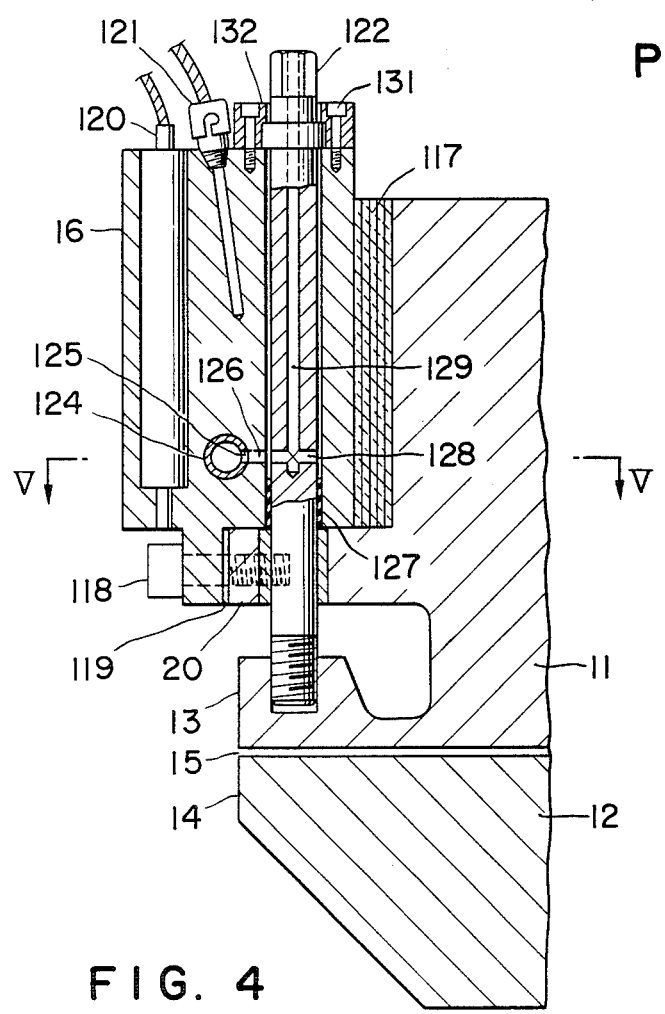
FIG. 4 is a longitudinal sectional view showing another modification of this invention.
Figure 5:
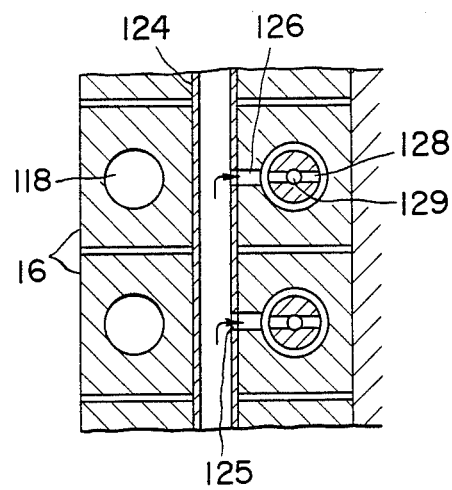
FIG. 5 is a sectional view of the modification shown in FIG. 4 taken along a line V—V.

FIGS. 4 and 5 show still another embodiment of this invention in which the same or corresponding parts as those shown in FIGS. 1 and 2 are designated by the same reference numerals. As shown in FIG. 4, a plurality of heat displacing units 16 are juxtaposed with heat insulating sheets 117 disposed between the units 16 and the upper die block 11. The lower end fo each unit 16 is secured to the projection 20 by a bolt 118 and a shim 119 is interposed between the lower end of the unit 16 and the projection 20 for compensating for the difference in the total thickness of the heat insulating sheets 117. An electric heater 120 and a thermocouple 121 are inserted into the heat displacing unit 16 and a bolt 122 threaded to the upper surface of flexible lip 13 loosely extends through an opening of the unit 16. The bolt 122 is secured to the top of the heat displacing unit 16 through screws 131 and a clamping member 132.

As shown in FIG. 5, an air supply pipe 124 with one end closed and the other end connected to a source of air, not shown, is inserted through juxtaposed heat displacing units 16. The air supply pipe 124 is formed with openings 125 at portions facing bolts 122, the openings 125 being in communication with air supply ports 126 respectively connected with perforations 129 extending in the axial direction of the bolts 122. The lower end portion of each bolt 122 is surrounded by a sealing member 127, whereas the upper portion of the bolt 12 is sealed by clamping member 132. At positions confronting with the air supply port 126 are formed horizontal openings 128 communicating with longitudinal openings 129. Consequently, air supplied to air supply pipe 124 flows to the periphery of each bolt 122 through opening 125 and air supply port 126 and then discharged to the outside through horizontal opening 128 and longitudinal opening 129.

When the heat displacing unit 16 is heated by heater 120, it expands upwardly. Although at this time, bolt 122 too is heated by heater 120, the amount of thermal expansion of the unit 16 is greater than that of the bolt 122 because its periphery and the longitudinal opening 129 are cooled by air. Consequently, the upper end of each bolt 122 is pulled upwardly by the unit 16 thus flexing upwardly the flexible lip 13 so as to widen the lip gap 15 and increase the flow quantity of the molten resin. Since bolts 122 are cooled by air they are heated a little. The heat of the bolts 122 is transmitted to the molten resin through the flexible lips 13. The heat of respective heat displacing units 16 is transmitted to the molten resin via heat insulating sheets 117 and the upper die block 11 so as to decrease the viscosity of the molten resin thus increasing its flow quantity.

When heater 120 is deenergized, the heat displacing unit 16 and bolt 122 would shrink. Since bolt 122 is normally cooled by air, its amount of shrinkage is less than that of the unit 16. Anyhow, the flexible lip 13 is caused to flex downwardly by the bolt 122, thereby decreasing the flow quantity of the molten resin extruded through the lip gap 15. On the other hand, since the bolt 122 is not heated, the temperature of the flexible lip 13 is lower than when the heat displacing unit 16 is heated so that the viscosity of the molten resin is increased tending to decrease the flow quantity.

Figure 6:
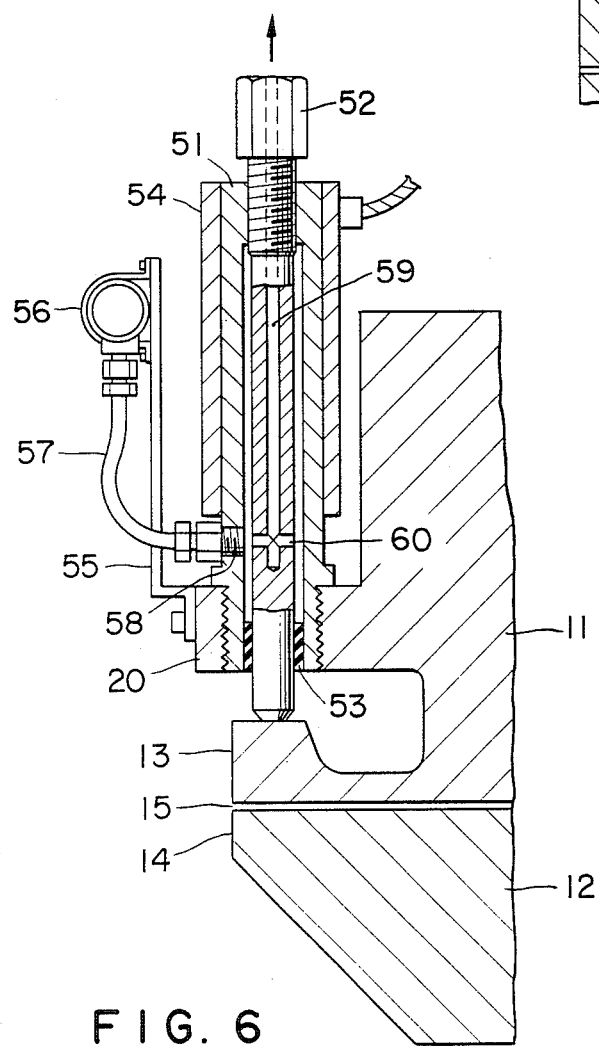
FIG. 6 is a longitudinal sectional view showing yet another modification of this invention.

FIG. 6 shows still another embodiment of this invention in which component parts corresponding to those shown in FIG. 4 are designated by the same reference characters. The lower end of each one of a plurality of juxtaposed heat displacing units 51 is threaded into the projection 20 of the upper die block 11. The lower end of each bolt 52 engages with the upper surface of the flexible lip 13, while its upper end is threaded into the upper end of the heat displacing unit 51. A sealing member 53 is interposed between bolt 52 and the lower end of the heat displacing unit 51. An electric heater 54 including a thermocouple, not shown, is provided to surround the unit 51. An air supply pipe 56 secured to the upper die block through a supporting plate 55 is connected to an air supply port 58 in the heat displacing unit 51 through a pipe 57, the air supply port 58 being communicated with a longitudinal opening 59 through bolt 52 via a horizontal opening 60.

This embodiment operates in the same manner as the embodiment shown in FIG. 4 except that the bolt 52 is pulled upwardly due to the difference in the thermal expansions when the heat displacing unit 51 is heated so that the flexible lip 13 flexes upwardly.

In the first two embodiments shown in FIGS. 1 and 2, one end of a heat displacing unit is secured to the upper die block, a bolt engaging with or secured to a flexible lip is disposed in parallel with the heat displacing unit and the opposite end of the bolt is secured to the heat displacing unit. Consequently, as the heat displacing unit is heated the bolt is pulled up so as to widen the lip gap to increase the flow quantity of a molten resin. At the same time, the temperature of the flexible lip increases due to the heat transmitted through the bolt so that the viscosity of the molten resin is decreased thereby increasing its flow quantity. In contrast to the prior art die, according to this invention the effect of the lip gap upon the flow quantity variation and the effect of the viscosity variation upon the flow quantity variation cumulatively cooperate with each other so that the thickness control of the extruded film can be made readily and precisely, thereby forming a resin film having constant thickness and smooth surface.

Where an infrared light gauge meter, for example, is provided to measure the thickness of the extruded sheet and when the heater provided for the heat displacing unit is controlled by the output of the gauge meter, a fully automatic control can be realized.

In other modifications shown in FIGS. 4-6, the bolt actuating the flexible lip is air cooled so that the amount of thermal expansion of the bolt becomes much smaller than that of the heat displacing unit and when this unit is heated the bolt would be pulled upwardly thus widening the lip gap and increasing the flow quantity of the molten resin.

What is claimed is:

1. In a heat displacing type die adapted to extrude a sheet of a molten resin wherein a plurality of heat displacing units juxtaposed in the transverse direction of said sheet are heat controlled so as to transmit thermal expansion or contraction of said units to flexible lips defining lip gaps through bolt means thereby adjusting said lip gaps, the improvement comprising:

means for securing one end of each heat displacing unit to a die block;
   means for flexing each flexible lip in response to thermal expansion or contraction of each heat displacing unit; and
   means for securely connecting one end of said bolt means to the other end of said heat displacing unit so that said bolt means is moved in response to said thermal expansion or contraction of said heat displacing unit,
   said heat displacing units having thermal expansion coefficients either equal to or greater than the thermal expansion coefficients of said bolt means,
   whereby said lip gaps are widened or narrowed when said heat displacing units respectively expand or contract.

2. The heat displacing type die according to claim 1 wherein said die is constituted by an upper die block and a lower die block and said flexible lip is provided for said upper die block beneath said bolt means.

3. The heat displacing type die according to claim 1 wherein one end of said bolt means is normally in contact with said flexible lip.

4. The heat displacing type die according to claim 1 wherein one end of said bolt means is securely connected to said flexing lip.

5. The heat displacing type die according to claim 1 further comprising heat insulating means interposed between said heat displacing unit and said die block.

6. The heat displacing type die according to claim 1 wherein each of said bolt means is provided with a longitudinal cooling air passage.

7. The heat displacing type die according to claim 6 further comprising a cooling air space between said bolt means and said heat displacing unit and communicated with said cooling air passage.

* * * * *